US012771499B2

(12) United States Patent
Guo et al.

(10) Patent No.: US 12,771,499 B2
(45) Date of Patent: *Oct. 20, 2026

(54) METHOD FOR DETERMINING TRANSPORT BLOCK SIZE

(71) Applicant: ZTE CORPORATION, Shenzhen (CN)

(72) Inventors: Qiujin Guo, Shenzhen (CN); Yu Ngok Li, Shenzhen (CN); Jun Xu, Shenzhen (CN); Jin Xu, Shenzhen (CN); Mengzhu Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,783

(22) Filed: May 1, 2024

(65) Prior Publication Data

US 2024/0356696 A1 Oct. 24, 2024

Related U.S. Application Data

(63) Continuation of application No. 17/869,683, filed on Jul. 20, 2022, now Pat. No. 12,010,052, which is a
(Continued)

(51) Int. Cl.
*H04W 72/12* (2023.01)
*H04B 7/06* (2006.01)
(Continued)

(52) U.S. Cl.
CPC ............. *H04L 5/0046* (2013.01); *H04W 8/24* (2013.01)

(58) Field of Classification Search
CPC ..... H04L 69/24; H04L 1/0007; H04L 5/0044; H04L 1/0084; H04L 1/0057;
(Continued)

(56) References Cited

U.S. PATENT DOCUMENTS 10,880,888 B2 12/2020 Guo et al.
10,924,202 B2 * 2/2021 Lin ....................... H04L 1/0071
(Continued)

FOREIGN PATENT DOCUMENTS

CN 102244628 A 11/2011
CN 109152017 A 1/2019
(Continued)

OTHER PUBLICATIONS

"3GPP Draft; R1-1800170 On TBS Determination Procedure", vol. RAN WG1, No. Vancouver, Canada; Jan. 22, 2018-Jan. 26, 2018 Jan. 13, 2018 (Jan. 13, 2018), XP051384660 (Year: 2018).*
(Continued)

*Primary Examiner* — Edan Orgad
*Assistant Examiner* — Vanneilian Lalchinthang
(74) *Attorney, Agent, or Firm* — Foley & Lardner LLP

(57) ABSTRACT

Method, systems and devices for determining a transport block size (TBS) are disclosed. The method comprises determining the TBS based on a parameter or a signaling associated with an event of determining an intermediate value of a TBS determination procedure, wherein the parameter or a signaling is available for a wireless terminal supporting a release version, wherein the intermediate value is determined based on a plurality of resource parameters, wherein the plurality of resource parameters comprises at least one of the total number of resource elements allocated to the wireless terminal, a rate, a modulation order, and the number of layers.

8 Claims, 9 Drawing Sheets

Related U.S. Application Data continuation of application No. PCT/CN2020/073369, filed on Jan. 21, 2020.

(51) Int. Cl.
*H04L 5/00* (2006.01)
*H04W 8/24* (2009.01)

(58) Field of Classification Search
CPC ... H04L 1/0058; H04L 5/0046; H04L 5/0094; H04W 72/1263; H04W 24/10; H04W 72/042; H04W 80/02; H04W 8/24; H04W 72/23; H03M 13/09; H03M 13/116; H04B 7/0626; H04B 7/0413; Y02D 30/70
USPC .......................................................... 370/329
See application file for complete search history.

(56) References Cited

U.S. PATENT DOCUMENTS

| | | | | |
|---|---|---|---|---|
| 11,166,273 | B2 * | 11/2021 | Wang | H04L 5/0016 |
| 11,451,280 | B2 * | 9/2022 | Song | H04L 5/001 |
| 2014/0067894 | A1 * | 3/2014 | Plondke | G06F 7/535 708/504 |
| 2017/0094668 | A1 * | 3/2017 | Tsai | H04B 7/0619 |
| 2019/0158221 | A1 * | 5/2019 | Sarkis | H03M 13/116 |
| 2020/0320776 | A1 * | 10/2020 | Doyle | G06T 9/00 |
| 2021/0153146 | A1 * | 5/2021 | Liu | H04L 5/0048 |
| 2021/0234571 | A1 | 7/2021 | Wang et al. | |
| 2022/0029737 | A1 * | 1/2022 | Park | H04B 7/024 |
| 2022/0201711 | A1 * | 6/2022 | Lee | H04W 72/0446 |
| 2022/0232623 | A1 * | 7/2022 | Lee | H04W 72/0446 |
| 2023/0043797 | A1 * | 2/2023 | Myung | H04L 1/0013 |

FOREIGN PATENT DOCUMENTS

| | | | | |
|---|---|---|---|---|
| EP | 1630773 | A1 * | 3/2006 | G09G 3/2055 |
| EP | 3 577 874 | A1 | 12/2019 | |
| WO | WO-2018/126413 | A1 | 7/2018 | |
| WO | WO-2019/069285 | A1 | 4/2019 | |
| WO | WO-2019/095315 | A1 | 5/2019 | |
| WO | WO-2019/191973 | A1 | 10/2019 | |

OTHER PUBLICATIONS

Extended European Search Report for EP Appl. No. 20887844.7, dated Jul. 19, 2023 (12 pages).
International Search Report and Written Opinion for PCT Appl. No. PCT/CN2020/073369, mailed Oct. 29, 2020 (8 pages).
Mediatek Inc., "On TBS determination procedure", 3GPP TSG RAN WG1 Meeting AH-1801, R1-1800170, Jan. 26, 2016, Vancouver, Canada (10 pages).
Non-Final Office Action on U.S. Appl. No. 17/869,683 Dtd Jul. 21, 2023.
Notice of Allowance on U.S. Appl. No. 17/869,683 Dtd Feb. 7, 2024.
Qualcomm Incorporated, "TBS and Base-graph Determination", 3GPP TSGRAN WG1 Meeting 91, R1-1720699, Dec. 1, 2017, Reno, USA (10 pages).
Hearing Notice for IN Appl. No. 202227040750 dated May 4, 2026 (4 pages).
"Multiplexing and channel coding," 3GPP TS 38.212 V15.8.0 Release 15, Jan. 20, 2020 (106 pages).
"Physical layer procedures for data," 3GPP TS 38.214 V15.8.0 Release 15, Jan. 11, 2020 (109 pages).
Ericsson, "Summary of CSI reporting v2," 3GPP R1-1801043, 3GPP RAN1 WG1 Meeting AH 1801, Jan. 22, 2018 (10 pages).
First Examination Report for IN Appl. No. 202227040750 dated Feb. 10, 2026 (10 pages).

* cited by examiner

| Definitions for parameter | Per | M | FDD-TDD DIFF | FR1-FR2 DIFF |
|---|---|---|---|---|
| **capability parameter** Indicates whether the UE supports float (Ninfo) | UE | Yes | No | No |

FIG. 7

| Definitions for parameter | Per | M | FDD-TDD DIFF | FR1-FR2 DIFF |
|---|---|---|---|---|
| **capability parameter** Indicates whether the UE supports floor (Ninfo) | UE | Yes | No | No |

FIG. 8

| Definitions for parameter | Per | M | FDD-TDD DIFF | FR1-FR2 DIFF |
|---|---|---|---|---|
| **capability parameter** Indicates whether the UE supports function (Ninfo), wherein function (x) is one of rounding down, rounding up, rounding or retaining at float decision | UE | Yes | No | No |

FIG. 9

| Definitions for parameter | Per | M | FDD-TDD DIFF | FR1-FR2 DIFF |
|---|---|---|---|---|
| **capability parameter** Indicates whether resource parameters satisfies $floor(N_{RE}*R*Qm*v)$=3824 are valid | UE | Yes | No | No |

FIG. 10

| Definitions for parameter | Per | M | FDD-TDD DIFF | FR1-FR2 DIFF |
|---|---|---|---|---|
| **capability parameter** Indicates whether resource parameters satisfies $3824 < float(N_{RE}*R*Qm*v) < 3825$ are valid | UE | Yes | No | No |

FIG. 11

| Definitions for parameter | Per | M | FDD-TDD DIFF | FR1-FR2 DIFF |
|---|---|---|---|---|
| **capability parameter** Indicates whether resource parameters satisfies $3824 \leq float(N_{RE}*R*Qm*v) < 3825$ are valid | UE | Yes | No | No |

FIG. 12

| Definitions for parameter | Per | M | FDD-TDD DIFF | FR1-FR2 DIFF |
|---|---|---|---|---|
| **capability parameter** Indicates whether TBS= 3824 is valid | UE | Yes | No | No |

FIG. 13

| Definitions for parameter | Per | M | FDD-TDD DIFF | FR1-FR2 DIFF |
|---|---|---|---|---|
| **capability parameter** Indicates whether TBS= 3840 and 3848 are valid | UE | Yes | No | No |

FIG. 14

| R \ TBS | ≤292 | 292<TBS≤3848 | >3848 |
|---|---|---|---|
| >2/3 | BG2 | BG1 | BG1 |
| 1/4<R≤2/3 | BG2 | BG2 | BG1 |
| ≤1/4 | BG2 | BG2 | BG2 |

FIG. 15

| R \ TBS | ≤292 | 292<TBS<3824 | ≥3824 |
|---|---|---|---|
| >2/3 | BG2 | BG1 | BG1 |
| 1/4<R≤2/3 | BG2 | BG2 | BG1 |
| ≤1/4 | BG2 | BG2 | BG2 |

FIG. 16

| R \ TBS | ≤292 | 292<TBS≤3824 | >3824 |
|---|---|---|---|
| >2/3 | BG2 | BG1 | BG1 |
| 1/4<R≤2/3 | BG2 | BG2 | BG2 |
| ≤1/4 | BG2 | BG2 | BG2 |

FIG. 17

| R \ TBS | ≤292 | 292<TBS≤maxTBS | |
|---|---|---|---|
| >2/3 | BG2 | BG1 | BG1 |
| 1/4<R≤2/3 | BG2 | BG1 | BG1 |
| ≤1/4 | BG2 | BG2 | BG2 |

FIG. 18

METHOD FOR DETERMINING TRANSPORT BLOCK SIZE

CROSS-REFERENCE TO RELATED APPLICATION

This is a continuation of U.S. application Ser. No. 17/869,683, filed Jul. 20, 2022, which claims the benefit of priority under 35 U.S.C. § 120 as a continuation of PCT Patent Application No. PCT/CN2020/073369, filed on Jan. 21, 2020, the disclosure of which is incorporated herein by reference in its entirety.

TECHNICAL FIELD

This document is directed generally to wireless communications.

SUMMARY

In current communication system, a transport block size (TBS) is determined by a set of resource parameters allocated by a base station, i.e., gNB. For transmissions of downlink/uplink (DL/UL) shared channel, different combinations of rate and TBS may have different base graphs of low-density parity check (LDPC) in physical downlink shared channel (PDSCH) and/or physical uplink shared channel (PUSCH). If the TBS determined by a user equipment (UE) is different from that understood by the gNB, the data transmissions between the UE and the gNB may fail. Hence, to ensure the reliability of data transmissions between the UE and the gNB, the TBS determined based on the same resource parameters should be the same and unique between the UE and network (e.g., the gNB) side.

This document relates to methods, systems, and devices for determining a transport block size, in particular to methods, systems, and devices for determining a transport block size based on a parameter or a signaling.

The present disclosure relates to a wireless communication method for use in a wireless terminal. The wireless communication method comprises:

- determining a transport block size, TBS, based on a parameter or a signaling associated with an event of determining an intermediate value of a TBS determination procedure,
- wherein the intermediate value is determined based on a plurality of resource parameters, and
- wherein the plurality of resource parameters comprises at least one of the total number of resource elements allocated to the wireless terminal, a rate, a modulation order, and the number of layers.

Various embodiments may preferably implement the following features:

Preferably or in some embodiments, the parameter or the signaling is a UE capability parameter or a UE feature or a high-layer signaling, or a UE category n, wherein n is an integer and not smaller than 1.

Preferably or in some embodiments, the wireless terminal supports a release version determined by a high-layer parameter.

Preferably or in some embodiments, the parameter or the signaling is available for the wireless terminal.

Preferably or in some embodiments, the wireless communication method further comprises determining the intermediate value based on a method determined by the parameter or the signaling.

Preferably or in some embodiments, the wireless terminal does not support a release version determined by a high-layer parameter.

Preferably or in some embodiments, the parameter or the signaling is not available for the wireless terminal.

Preferably or in some embodiments, the wireless communication method further comprises determining the intermediate value based on a predefined method.

Preferably or in some embodiments, the event is whether the intermediate value is modified by a predefined function; and the predefined function is one of rounding down, rounding up, rounding or retaining at a float precision.

Preferably or in some embodiments, the event is whether the plurality of resource parameters with specific values is valid.

Preferably or in some embodiments, the event is whether modifying a product of the plurality of resource parameters into a range by a predefined function is valid, and the predefined function is one of rounding down, rounding up, rounding or retaining at a float precision.

Preferably or in some embodiments, the function of retaining at a float precision represents reserving at least a decimal place or one place after the decimal point.

Preferably or in some embodiments, the (NRE*R*Qm*v) =3824.2536 and the function of retaining at a float precision reserves 3824.2536 as a number in the range between 3824.0001 and 3824.2536, for example, determine 3824.2536 as 3824.1, or determine 3824.2536 as 3824.2, or determine 3824.2536 as 3824.25, or determine 3824.2536 as 3824.5, or determine 3824.2536 as 3824.125.

Preferably or in some embodiments, the predefined function is one of rounding down, rounding up, or rounding and the range is an integer.

Preferably or in some embodiments, the integer is 3824.

Preferably or in some embodiments, the predefined function is retaining at the float precision and the range is between two float numbers.

Preferably or in some embodiments, the two float numbers are between 3824 and 3825.

Preferably or in some embodiments, the event is whether the TBS corresponding to each intermediate value of an intermediate value set is valid.

Preferably or in some embodiments, the TBS corresponding to each intermediate value of the intermediate value set comprises at least one of 3824, 3840 or 3848.

Preferably or in some embodiments, the TBS corresponding to each intermediate value of the intermediate value set is determined based on a predefined function of modifying the intermediate value.

Preferably or in some embodiments, the predefined function is rounding down and the TBS corresponding to each intermediate value of the intermediate value set comprises 3840 and 3848.

Preferably or in some embodiments, the predefined function is rounding up and the TBS corresponding to each intermediate value of the intermediate value set comprises 3824.

Preferably or in some embodiments, the wireless communication method further comprises determining a base graph of data processing based on the TBS, wherein a threshold which is related to the TBS and used for determining the base graph is adjusted by a modified factor at at least one event.

Preferably or in some embodiments, the modified factor is smaller than or equal to 24 and is greater than or equal to −24.

Preferably or in some embodiments, the at least one event comprises at least one of the intermediate value being a number between two adjacent integers; the intermediate value is a number that is equal to one of the two adjacent integers; or the TBS is among the TBSs in a quantized set, wherein the TBSs in the quantized set is between 3824 and 3848, and are evenly divisible by 8.

Preferably or in some embodiments, the two adjacent integers are 3824 and 3825.

Preferably or in some embodiments, the wireless communication method further comprises transmitting, to the wireless network node, the parameter or the signaling associated with the intermediate value of determining the TBS.

Preferably or in some embodiments, if the parameter or the signaling is not transmitted to the wireless network node, the UE shall determine the intermediate value based on the method associated with the event determined by the last recent parameter or the signaling.

Preferably or in some embodiments, wherein the TBS is determined by determining the TBS by using a predefined calculation method of determining the intermediate value when determining that the parameter or the signaling does not exist or that the parameter or the signaling is not transmitted to the wireless network node.

Preferably or in some embodiments, the predefined calculation method rounds the intermediate value down.

Preferably or in some embodiments, the predefined calculation method rounds the product of intermediate value and 2N down, wherein N is an integer that not smaller than 5.

Preferably, wherein the predefined calculation method rounds the intermediate value up.

Preferably or in some embodiments, the predefined calculation method rounds the intermediate value.

Preferably or in some embodiments, wherein the predefined calculation method retains the intermediate value at a float precision.

Preferably or in some embodiments, the plurality of resource parameters with specific values is valid in the predefined calculation method.

Preferably or in some embodiments, modifying a product of the plurality of resource parameters with the specific values into a range by a predefined function is valid in the predefined calculation method, and the predefined function is one of rounding down, rounding up, rounding or retaining at a float precision.

Preferably or in some embodiments, the predefined function is one of rounding down, rounding up, or rounding and the range is an integer.

Preferably or in some embodiments, the integer is 3824.

Preferably or in some embodiments, the predefined function is retaining at the float precision and the range is between two float numbers.

Preferably or in some embodiments, the two float numbers are between 3824 and 3825.

Preferably or in some embodiments, the TBS corresponding to each intermediate value of an intermediate value set is valid in the predefined calculation method.

Preferably or in some embodiments, the TBS corresponding to each intermediate value of the intermediate value set comprises at least one of 3824, 3840 or 3848.

Preferably or in some embodiments, the TBS corresponding to each intermediate value of the intermediate value set is determined based on a predefined function of modifying the intermediate value.

Preferably or in some embodiments, the predefined function is rounding down and the TBS corresponding to each intermediate value of the intermediate value set comprises 3840 and 3848.

Preferably or in some embodiments, the predefined function is rounding up and the TBS corresponding to each intermediate value of the intermediate value set comprises 3824.

Preferably or in some embodiments, the wireless communication method further comprises performing data communications with a wireless communication node based on the TBS.

Preferably or in some embodiments, the wireless communication method further comprises receiving, from a wireless network node, control information comprising the plurality of resource parameters; calculating the intermediate value based on the plurality of resource parameters; modifying the intermediate value based on the parameter or the signaling; and determining the TBS based on the modified intermediate value.

The present disclosure relates to wireless communication method for use in a wireless network node. The wireless communication method comprises:

determining a transport block size, TBS, based on a parameter or the signaling associated with an event associated of determining an intermediate value of a TBS determination procedure, wherein the intermediate value is determined based on a plurality of resource parameters, wherein the plurality of resource parameters comprises at least one of the total number of resource elements allocated to a wireless terminal, a rate, a modulation order, and the number of layers.

Various embodiments may preferably implement the following features:

Preferably or in some embodiments, the parameter or the signaling is a UE capability parameter or a UE feature or a high-layer signaling, or a UE category n, wherein n is an integer and not smaller than 1.

Preferably or in some embodiments, the wireless communication method further comprises:

receiving, from the wireless terminal, the parameter or the signaling, and determining the intermediate value based on a method determined by the parameter or the signaling.

Preferably or in some embodiments, the wireless communication method further comprises at least one of the following:

determining the UE is supported a specific release version, or determining the intermediate value based on a predefined method.

Preferably or in some embodiments, the wireless communication method further comprises:

receiving, from the wireless terminal, the parameter or the signaling at least once, and determining the intermediate value based on a method determined by the parameter or the signaling.

Preferably or in some embodiments, the wireless communication method further comprises at least one of the following:

determining the parameter or the signaling is not received, or determining the intermediate value based on a predefined method.

Preferably or in some embodiments, the wireless communication method further comprises:

receiving, from the wireless terminal, the parameter or the signaling at least once, and determining the intermediate value based on a method determined by the parameter or the signaling.

Preferably or in some embodiments, the wireless communication method further comprises at least one of the following:

determining the UE is supported a specific release version, determining the parameter or the signaling is not received, or determining the intermediate value based on a predefined method.

Preferably or in some embodiments, the wireless communication method further comprises:

receiving, from the wireless terminal, the parameter or the signaling at least once, and determining the intermediate value based on a method determined by the parameter or the signaling.

Preferably or in some embodiments, the event is whether the intermediate value is modified by a predefined function; and the predefined function is one of rounding down, rounding up, rounding or retaining at a float precision.

Preferably or in some embodiments, the event is whether the plurality of resource parameters with specific values is valid.

Preferably or in some embodiments, the event is whether modifying a product of the plurality of resource parameters into a range by a predefined function is valid, and the predefined function is one of rounding down, rounding up, rounding or retaining at a float precision.

Preferably or in some embodiments, the predefined function is one of rounding down, rounding up, or rounding and the range is an integer.

Preferably or in some embodiments, the integer is 3824.

Preferably, the predefined function is retaining at the float precision and the range is between two float numbers.

Preferably or in some embodiments, the two float numbers are between 3824 and 3825.

Preferably or in some embodiments, the event is whether the TBS corresponding to each intermediate value of an intermediate value set is valid.

Preferably or in some embodiments, the TBS corresponding to each intermediate value of the intermediate value set comprises at least one of 3824, 3840 or 3848.

Preferably or in some embodiments, the TBS corresponding to each intermediate value of the intermediate value set is determined based on a predefined function of modifying the intermediate value.

Preferably or in some embodiments, the predefined function is rounding down and the TBS corresponding to each intermediate value of the intermediate value set comprises 3840 and 3848.

Preferably or in some embodiments, the predefined function is rounding up and the TBS corresponding to each intermediate value of the intermediate value set comprises 3824.

Preferably or in some embodiments, the wireless communication further comprises determining a base graph of data processing based on the TBS, wherein a threshold which is related to the TBS and used for determining the base graph is adjusted by a modified factor at least one event.

Preferably or in some embodiments, the modified factor is smaller than or equal to 24 and is greater than or equal to −24.

Preferably or in some embodiments, the at least one event comprises at least one of the intermediate value being a number between two adjacent integers; the intermediate value is a number that is equal to one of the two adjacent integers; or the TBS is among the TBSs in a quantized set, wherein the TBSs in the quantized set is between 3824 and 3848, and are evenly divisible by 8.

Preferably or in some embodiments, the two adjacent integers are 3824 and 3825.

Preferably or in some embodiments, the wireless communication method further comprises receiving, from the wireless terminal, the parameter or the signaling associated with the intermediate value of determining the TBS.

Preferably or in some embodiments, if the parameter or the signaling is not transmitted from the wireless terminal, the intermediate value shall be determined by the method associated with the event determined by the last recent reported parameter or the signaling.

Preferably or in some embodiments, the TBS is determined by determining the TBS by using a predefined calculation method of determining the intermediate value when determining that the wireless terminal does not have the parameter or the signaling or that the parameter or the signaling is not transmitted from the wireless terminal.

Preferably or in some embodiments, the predefined calculation method rounds the product of intermediate value and 2N down, wherein N is an integer that not smaller than 5.

Preferably or in some embodiments, the predefined calculation method rounds the intermediate value down.

Preferably or in some embodiments, the predefined calculation method rounds the intermediate value up.

Preferably or in some embodiments, the predefined calculation method rounds the intermediate value.

Preferably or in some embodiments, the predefined calculation method retains the intermediate value at a float precision.

Preferably or in some embodiments, the plurality of resource parameters with specific values is valid in the predefined calculation method.

Preferably or in some embodiments, modifying a product of the plurality of resource parameters with the specific values into a range by a predefined function is valid in the predefined calculation method, and the predefined function is one of rounding down, rounding up, rounding or retaining at a float precision.

Preferably or in some embodiments, the predefined function is one of rounding down, rounding up, or rounding and the range is an integer.

Preferably or in some embodiments, the integer is 3824.

Preferably or in some embodiments, the predefined function is retaining at the float precision and the range is between two float numbers.

Preferably or in some embodiments, the two float numbers are between 3824 and 3825.

Preferably or in some embodiments, the TBS corresponding to each intermediate value of an intermediate value set is valid in the predefined calculation method.

Preferably or in some embodiments, the TBS corresponding to each intermediate value of the intermediate value set comprises at least one of 3824, 3840 or 3848.

Preferably or in some embodiments, the TBS corresponding to each intermediate value of the intermediate value set is determined based on a predefined function of modifying the intermediate value.

Preferably or in some embodiments, the predefined function is rounding down and the TBS corresponding to each intermediate value of the intermediate value set comprises 3840 and 3848.

Preferably or in some embodiments, the predefined function is rounding up and the TBS corresponding to each intermediate value of the intermediate value set comprises 3824.

Preferably or in some embodiments, the wireless communication method further comprises performing data communications with the wireless terminal based on the TBS.

Preferably or in some embodiments, the wireless communication method further comprises transmitting, to the wireless terminal, control information comprising the plurality of resource parameters; calculating the intermediate value based on the plurality of resource parameters; modifying the intermediate value based on the parameter or the signaling; and determining the TBS based on the modified intermediate value.

The present disclosure relates to a wireless communication method for use in a wireless terminal. The wireless communication method comprises determining a base graph of data processing based on a transport block size, TBS, wherein a threshold which is related to the TBS and used for determining the base graph is adjusted by a modified factor at at least one event.

Various embodiments may preferably implement the following features:

Preferably or in some embodiments, the modified factor is smaller than or equal to 24 and is greater than or equal to −24.

Preferably or in some embodiments, the at least one event comprises at least one of an intermediate value of determining the TBS being a number between two adjacent integers; the intermediate value is a number that is equal to one of the two adjacent integers; or the TBS is among the TBSs in a quantized set, wherein the TBSs in the quantized set is between 3824 and 3848, and are evenly divisible by 8.

Preferably or in some embodiments, the two adjacent integers are 3824 and 3825.

Preferably or in some embodiments, the wireless communication method further comprises performing data communications with a wireless communication node based on the TBS and the base graph.

The present disclosure relates to a wireless communication method for use in a wireless network node. The wireless communication method comprises determining a base graph of data processing based on a transport block size, TBS, wherein a threshold which is related to the TBS and used for determining the base graph is adjusted by a modified factor at least one event.

Various embodiments may preferably implement the following features:

Preferably or in some embodiments, the modified factor is smaller than or equal to 24 and is greater than or equal to −24.

Preferably or in some embodiments, the at least one event comprises at least one of an intermediate value of determining the TBS being a number between two adjacent integers; the intermediate value being a number that is equal to one of the two adjacent integers; or the TBS being among the TBSs in a quantized set, wherein the TBSs in the quantized set is between 3824 and 3848, and are evenly divisible by 8.

Preferably or in some embodiments, the two adjacent integers are 3824 and 3825.

Preferably or in some embodiments, the wireless communication method further comprises performing data communications with a wireless terminal based on the TBS and the base graph.

The present disclosure relates to a wireless terminal, comprising a processor. The processor is configured to:

- determine a transport block size, TBS, based on a parameter or a signaling associated with an event of determining an intermediate value of a TBS determination procedure, wherein the intermediate value is determined based on a plurality of resource parameters,
- wherein the plurality of resource parameters comprises at least one of the total number of resource elements allocated to the wireless terminal, a rate, a modulation order, and the number of layers.

Various embodiments may preferably implement the following features:

Preferably or in some embodiments, the parameter or the signaling is a UE capability parameter or a UE feature or a high-layer signaling, or a UE category n, wherein n is an integer and not smaller than 1.

Preferably or in some embodiments, the processor is further configured to perform a wireless communication method of any of the foregoing described methods.

The present disclosure relates to a wireless network node, comprising a processor which is configured to:

- determine a transport block size, TBS, based on a parameter or a signaling associated with an event of determining an intermediate value of a TBS determination procedure,
- wherein the intermediate value is determined based on a plurality of resource parameters,
- wherein the plurality of resource parameters comprises at least one of the total number of resource elements allocated to a wireless terminal, a rate, a modulation order, and the number of layers.

Various embodiments may preferably implement the following features:

Preferably or in some embodiments, the parameter or the signaling is a UE capability parameter or a UE feature or a high-layer signaling, or a UE category n, wherein n is an integer and not smaller than 1.

Preferably or in some embodiments, the processor is further configured to perform a wireless communication method of any of the foregoing described methods.

The present disclosure relates to a wireless terminal, comprising a processor. The processor is configured to:

- determine a base graph of data processing based on a transport block size, TBS, wherein a threshold which is related to the TBS and used for determining the base graph is adjusted by a modified factor at at least one event.

Various embodiments may preferably implement the following feature:

Preferably or in some embodiments, the processor is further configured to perform a wireless communication method of any of the foregoing described methods.

The present disclosure relates to a wireless network node, comprising a processor which is configured to:

- determine a base graph of data processing based on a transport block size, TBS, wherein a threshold which is related to the TBS and used for determining the base graph is adjusted by a modified factor at least one event.

Various embodiments may preferably implement the following feature:

Preferably or in some embodiments, the processor is further configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 7 shows a table related to the parameter or the signaling according to an embodiment of the present disclosure.

FIG. 8 shows a table related to the parameter or the signaling according to an embodiment of the present disclosure.

FIG. 9 shows a table related to the parameter or the signaling according to an embodiment of the present disclosure.

FIG. 10 shows a table related to the parameter or the signaling according to an embodiment of the present disclosure.

FIG. 11 shows a table related to the parameter or the signaling according to an embodiment of the present disclosure.

FIG. 12 shows a table related to the parameter or the signaling according to an embodiment of the present disclosure.

FIG. 13 shows a table related to the parameter or the signaling according to an embodiment of the present disclosure.

FIG. 14 shows a table related to the parameter or the signaling according to an embodiment of the present disclosure.

FIG. 15 shows a table related to base graph selection according to an embodiment of the present disclosure.

FIG. 16 shows a table related to base graph selection according to an embodiment of the present disclosure.

FIG. 17 shows a table related to base graph selection according to an embodiment of the present disclosure.

FIG. 18 shows a table related to base graph selection according to an embodiment of the present disclosure.

DETAILED DESCRIPTION

Figure 1:
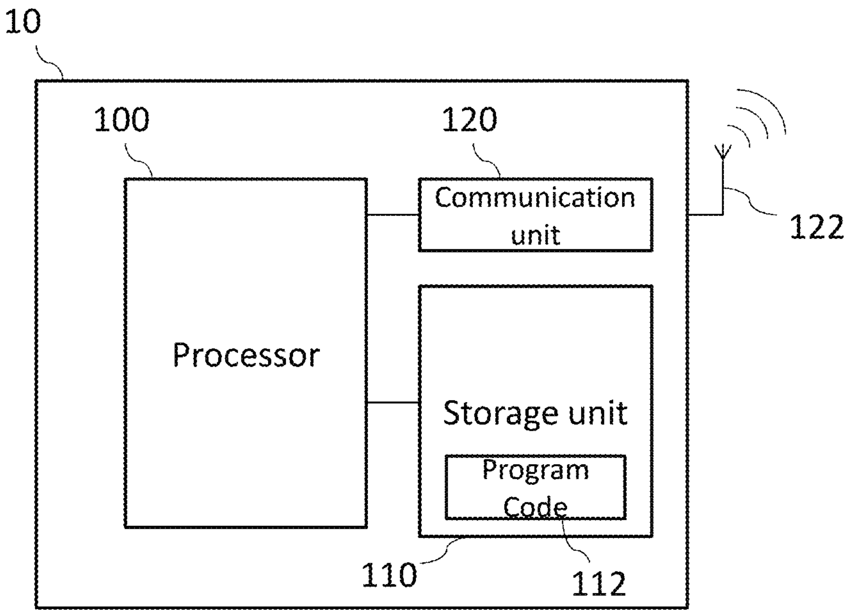
FIG. 1 shows an example of a schematic diagram of a network device according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g., messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10.

The communication unit 120 may be a transceiver. The communication unit 120 may as an alternative or in addition be combining a transmitting unit and a receiving unit configured to transmit and to receive, respectively, signals to and from a wireless network node (e.g,. a base station).

Figure 2:
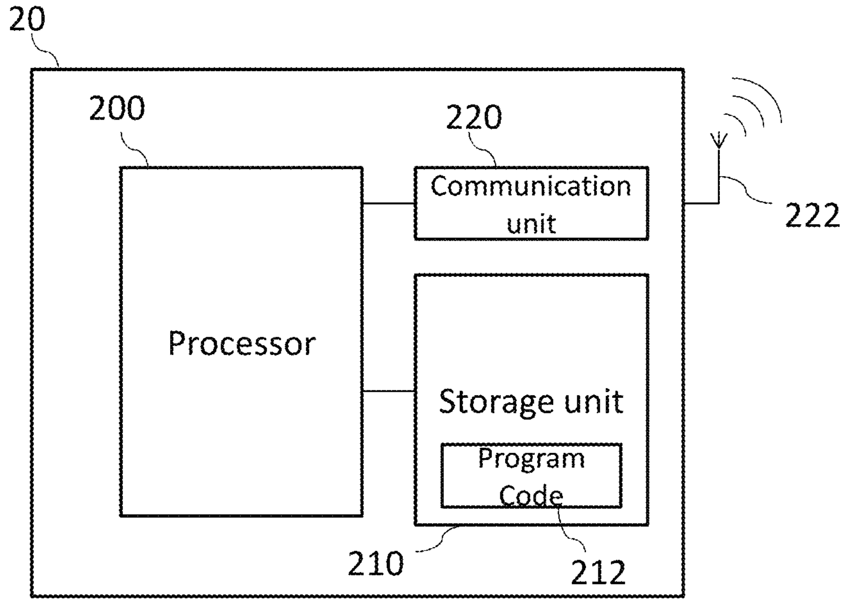
FIG. 2 shows an example of a schematic diagram of a network node according to an embodiment of the present disclosure.

FIG. 2 relates to a schematic diagram of a wireless network node 20 according to an embodiment of the present disclosure. The wireless network node 20 may be a base station (BS), a network entity, a Mobility Management Entity (MME), Serving Gateway (S-GW), Packet Data Network (PDN) Gateway (P-GW), or Radio Network Controller (RNC), and is not limited herein. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g., messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20.

The communication unit 220 may be a transceiver. The communication unit 220 may as an alternative or in addition be combining a transmitting unit and a receiving unit configured to transmit and to receive, respectively, signals to and from a wireless terminal (e.g., a user equipment).

In an embodiment, a procedure of determining a transport block size (TBS) for a UE/BS may include the following steps:

Step 1: Computing the number NRE of resource elements by obtaining time and frequency domain resource allocation configured by control information (e.g. L1 signaling and high-layer parameters). In an embodiment, the UE receives the control information from the BS.

In an embodiment, step 1 determines the total number NRE of resource elements within the slot allocated for physical downlink shared channel (PDSCH) or physical uplink shared channel (PUSCH) by:

$$N_{RE} = \min(156, N'_{RE}) \cdot n_{PRB}.$$

where $n_{PRB}$ is the total number of allocated physical resource blocks (PRBs) for the UE, and $$N'_{RE}$$

is the number of resource elements (REs) within a PRB and is determined by some resource parameters, e.g. $N_{sc}^{RB}$ is the number of subcarriers in a PRB, $$N_{symb}^{sh}$$

is the number of symbols of the PDSCH/PUSCH allocation within the slot, $$N_{DMRS}^{PRB} \text{ and } N_{oh}^{PRB}$$

is determined by DCI format(s) and/or higher layer parameter(s).

Step 2: Computing an intermediate value $N_{info}$ by calculating a product of the number $N_{RE}$ of resource elements, a value R related to rate, a modulation order $Q_m$ and the number v of layers, for determining the TBS; and performing step 3 when the intermediate value $N_{info}$ is not greater than 3824, otherwise, performing step 4.

In an embodiment, the intermediate value $N_{info}$ is obtained by:

$$N_{info} = N_{RE} \cdot R \cdot Q_m \cdot v$$

Step 3: Quantizing the intermediate value $N_{info}$ by the following formula:

$$N'_{info} = \max\left(24, 2^n \cdot \left\lfloor \frac{N_{info}}{2^n} \right\rfloor\right), \text{ where } n = \max(3, \lfloor \log_2 N_{info} \rfloor - 6),$$

and use the Table A-1 as shown in Appendix find the closest TBS that is not smaller than $$N'_{info}.$$

Step 4: Quantizing the intermediate value $N_{info}$ by the following formula:

$$N'_{info} = \max\left(3840, 2^n \times \text{round}\left(\frac{N_{info} - 24}{2^n}\right)\right),$$
$$\text{where } n = \lfloor \log_2(N_{info} - 24) \rfloor - 5.$$

and the TBS is determined according to the following formula:

$$\text{when } R \le 1/4,\ TBS = 8 \cdot C \cdot \left\lceil \frac{N'_{info} + 24}{8 \cdot C} \right\rceil - 24 \text{ where } C = \left\lceil \frac{N'_{info} + 24}{3816} \right\rceil$$

$$\text{when } R > 1/4 \text{ and } N'_{info} > 8424,\ TBS = 8 \cdot C \cdot \left\lceil \frac{N'_{info} + 24}{8 \cdot C} \right\rceil - 24$$
$$\text{where } C = \left\lceil \frac{N'_{info} + 24}{8424} \right\rceil$$

$$\text{when } R > 1/4 \text{ and } N'_{info} \le 8424,\ TBS = 8 \cdot \left\lceil \frac{N'_{info} + 24}{8} \right\rceil - 24$$

In the above procedure of determining the TBS, the value R related to rate and the modulation order $Q_m$ used to determine the intermediate value $N_{info}$ in step 2 is obtained by an index of modulation and coding scheme ($I_{MCS}$) and modulation and coding scheme (MCS) tables configured by L1 signaling (e.g., downlink control information (DCI)) and high-layer parameters. In the MCS tables, the value R related to rate is a float value. Therefore, the intermediate value $N_{info}$ needs to be retained sufficient precision, to avoid making a wrong choice on performing the step 3 or step 4 as the subsequence step based on the comparison between the intermediate value $N_{info}$ and the integer (i.e., 3824) in step 2.

However, the UE with different capability may have different implementations on the numeric precision of the intermediate value $N_{info}$. For example, the UE only working with integers may use step 3 as the next step of TBS determination when the intermediate value $N_{info}$ is larger than 3824 and less than 3825. In comparison, the UE working with floats may use step 4 as the next step when the intermediate value $N_{info}$ is larger than 3824 and less than 3825. Under such a condition, two different TBSs, e.g. 3824 and 3840, may be determined based on the same resource parameters.

Moreover, the UE and/or the BS may determine different base graphs (e.g., base graphs of low density parity check (LDPC)) related to data processing (e.g. encoding data) if the UE and the BS have different understandings on the numeric precision of the intermediate value since the base graph is determined based on the TBS. For example, when the value R related to rate is larger than ¼ and less than ⅔, a base graph BG1 is determined if the TBS is greater than 3824 and a base graph BG2 is determined if the TBS is smaller than or equal to 3824. In other words, the UE and the BS may determine different base graphs when the UE and the BS have different understandings on the numeric precision of the intermediate value, resulting in transmission failures. These are all irretrievable impacts on the wireless communication system.

In an embodiment, considering different understandings on determining (e.g., modifying) the intermediate value $N_{info}$, the present disclosure provides a method of determining the TBS based on a parameter or a signaling associated with an event of determining the intermediate value $N_{info}$, so as to ensure the reliability of data transmissions between the UE and the BS. In an embodiment, the parameter or the signaling indicates the capability of UE processing (e.g., modifying) the intermediate value $N_{info}$ during the procedure of determining the TBS.

In an embodiment, BS obtains the release version of the UE based on a high-layer parameter. In an embodiment, the high-layer parameter can indicate at least one of the release versions. In an embodiment, the release versions supported by a UE includes at least one of the following: release 15, release 16, release 17. For example, the high-layer parameter is the information element AccessStratumRelease indicates the release supported by the UE.

AccessStratumRelease Information Element

```
    i.ASN1START
   ii.TAG-ACCESSSTRATUMRELEASE-START
       AccessStratumRelease ::= ENUMERATED {
   i.rel15, spare7, spare6, spare5, spare4, spare3, spare2, spare1, ... }
  ii.TAG-ACCESSSTRATUMRELEASE-STOP
 iii.ASN1STOP
```

In an embodiment, the spare7 can represent the release after release 15. For example, the spare7 represents the release16 supported by the UE. In an embodiment, the UE shall inform the BS of the current release supported by the UE. In an embodiment, the UE can report the UE feature(s) information supported by the UE. In an embodiment, the UE feature(s) information corresponds to the reported release version. In an embodiment, the UE feature(s) information corresponds to the other release version except for the reported release version. In an embodiment, the UE feature(s) information includes the parameter or signaling associated with the event of determining the intermediate value of the TBS determination procedure. In an embodiment, the feature associated with the event of determining the intermediate value is available for rel15-UE. In an embodiment, the feature associated with the event of determining the intermediate value is available for rel16-UE. In an embodiment, the feature associated with the event of determining the intermediate value is available for both rel15-UE and rel16-UE. Note that, the rel15-UE represents the UE supporting release 15, the rel16-UE represents the UE supporting release 16, and so on.

In an embodiment, the parameter associated with an event of determining the intermediate value $N_{info}$ is used for a predefined type of UE. In an embodiment, the predefined type of UE is a UE supporting release 15. In an embodiment, the UE supporting release 15 shall determine the intermediate value based on the method indicated by the UE feature reported by the UE. In an embodiment, the UE supporting other release(s) after release 15, e.g., release 16, determines the intermediate value based on the predefined method.

In an embodiment, the predefined type of UE is a UE supporting the release after release 15. For example, the predefined type of UE is a UE supporting release 16. In an embodiment, the UE supporting release 16 shall determine the intermediate value based on the reported method indicated by the feature.

In an embodiment, the predefined type of UE is a UE supporting release 16. In an embodiment, the UE supporting release 16 shall determine the intermediate value based on the method indicated by the UE feature reported by the UE. In an embodiment, the UE shall determine the intermediate value based on the method supported by the UE in release 16 if the UE supporting release 16 falls back to the release 15-UE feature(s).

In an embodiment, the predefined type of UE is a UE supporting both release 15 and the release(s) after release 15. For example, the predefined type of UE is a UE supporting release 15 and release 16. In an embodiment, the UE shall determine the intermediate value based on the method supported by the UE in release 16 if the UE supporting release 16 falls back to the release 15-UE feature(s).

In an embodiment, the predefined method of determining the intermediate value is $$N_{info} = \text{function}(N_{RE} \cdot R \cdot Q_m \cdot v)$$

where function(x) represents transforming the value of x into an integer. In an embodiment, function(x) represents rounding the value of x down to an integer. In an embodiment, function(x) represents rounding the value of x up to an integer. In an embodiment, function(x) represents rounding the value of x to an integer.

In an embodiment, the BS schedules data to the UE based on the parameter or the signaling. In an embodiment, the UE calculates the intermediate value $N_{info}$ based on the parameter or the signaling for determining the TBS. In an embodiment, the UE has (e.g., equips with) the parameter or the signaling and transmits (e.g., reports) the parameter or the signaling to the BS.

Figure 3:
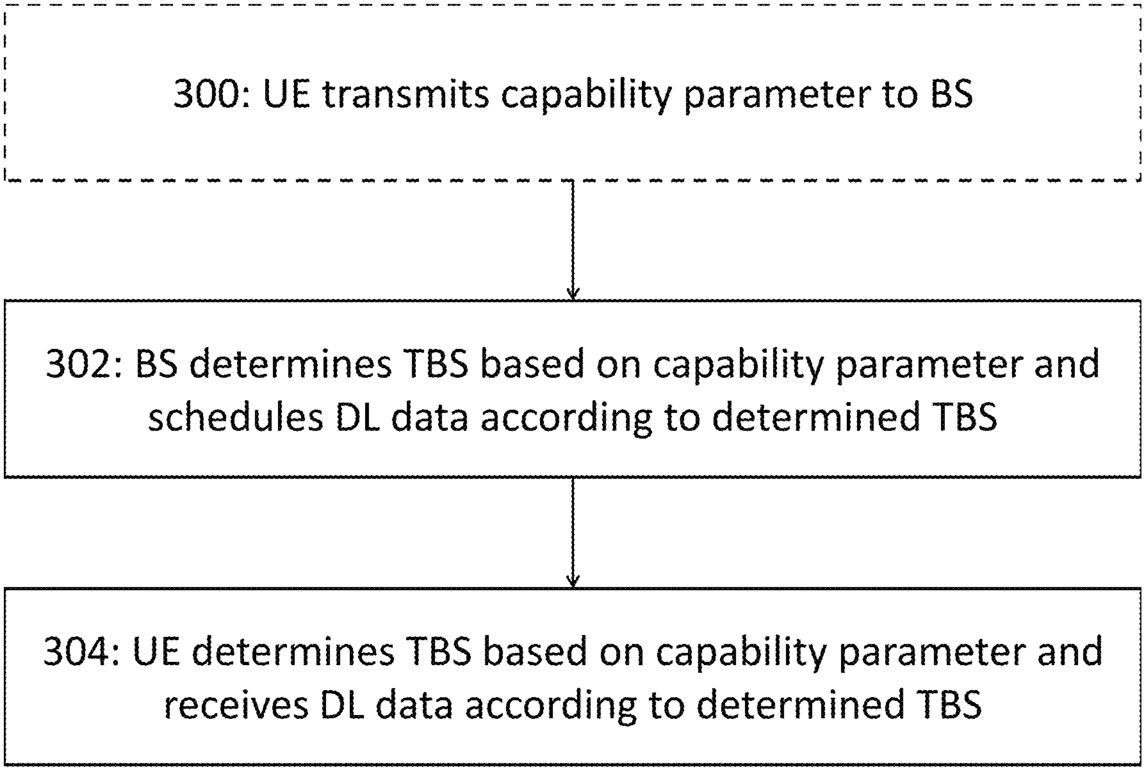
FIG. 3 shows a schematic diagram of a procedure of DL data transmissions between the UE and the BS according to an embodiment of the present disclosure.

FIG. 3 shows a schematic diagram of a procedure of DL data transmissions between the UE and the BS according to an embodiment of the present disclosure. In FIG. 3, the BS determines a TBS based on the parameter or the signaling, e.g., by using the aforementioned procedure of determining the TBS. According to the determined TBS, the BS schedules DL data to the UE (step 302). In an embodiment, the BS also transmits DCI to the UE in step 302. Similarly, the UE determines a TBS based on the parameter or the signaling and receives the DL data, from the BS, by using a payload size equal to the determined TBS (step 304). Because both the BS and the UE determine the TBS based on the parameter or the signaling, the BS and the UE determine the same TBS and the reliability of data transmissions between the BS and the UE is ensured. In an embodiment, the UE has the parameter or the signaling and transmits (e.g., reports) the parameter or the signaling to the BS (step 300).

In an embodiment, the parameter or the signaling is a UE capability parameter or a UE feature or a high-layer signaling, or a UE category n, wherein n is an integer and not smaller than 1.

Figure 4:
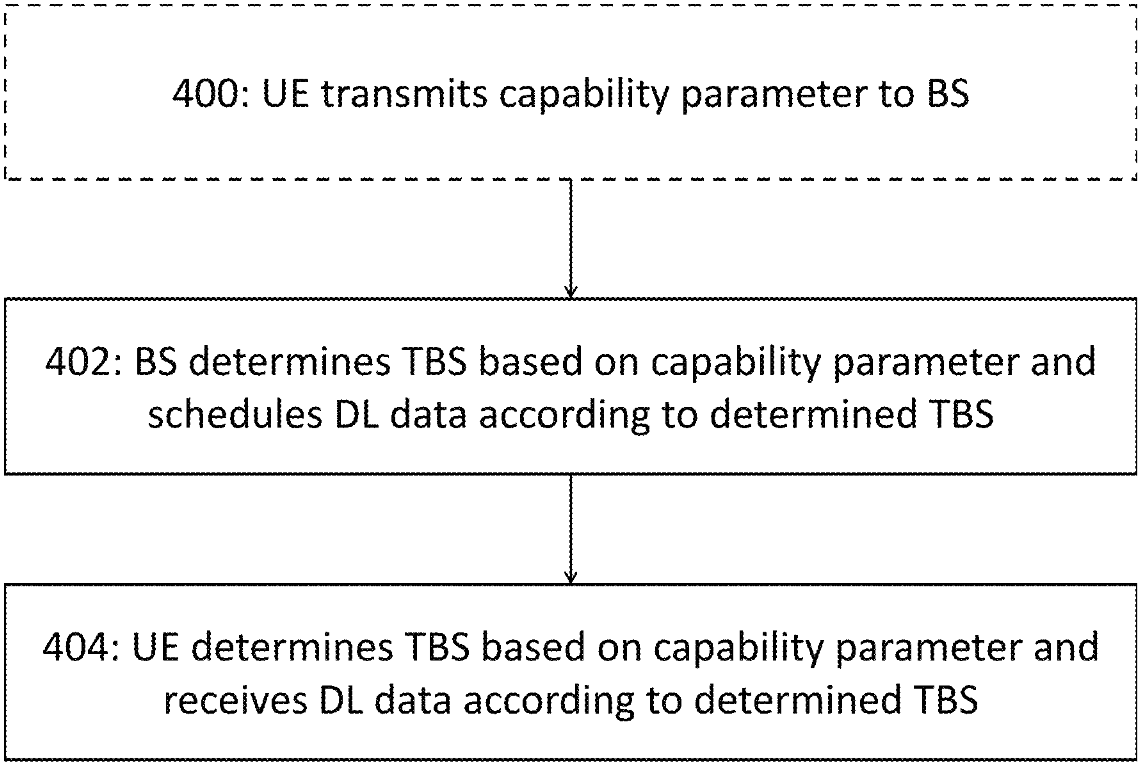
FIG. 4 shows a schematic diagram of a procedure of UL data transmissions between the UE and the BS according to an embodiment of the present disclosure.

FIG. 4 shows a schematic diagram of a procedure of UL data transmissions between the UE and the BS according to an embodiment of the present disclosure. In FIG. 4, the UE determines a TBS based on the parameter or the signaling, e.g., by using the aforementioned procedure of determining the TBS. Next, the UE transmits UL data to the BS according to the determined TBS (e.g., a payload size of the UL data is equal to the TBS) (step 402). Similarly, the BS determines a TBS based on the parameter or the signaling and receives the UL data, from the UE, according to the determined TBS (step 404). Because both the BS and the UE determine the TBS based on the parameter or the signaling, the BS and the UE determine the same TBS and the reliability of data transmissions between the BS and the UE is ensured. In an embodiment, the UE has the parameter or the signaling and transmits (e.g., reports) the parameter or the signaling to the BS (step 400).

In an embodiment, the BS determines the TBS by using a predefined calculation method associated with the intermediate value $N_{info}$ according to the parameter or the signaling. In an embodiment, the UE determines the TBS by using a predefined calculation method associated with the intermediate value $N_{info}$ according to the parameter or the signaling. In an embodiment, the UE does not have the parameter or the signaling, or the parameter or the signaling is not transmitted to the BS. In an embodiment, the TBS associated with the intermediate value $N_{info}$ or resource allocation satisfied with a predefined condition is not expected or required to be used in the predefined calculation method. In an embodiment, the predefined condition is that the intermediate value $N_{info}$ equals to at least one of the float numbers between 3824 and 3825. In an embodiment, the predefined condition is the intermediate value $N_{info}$ is rounded down to 3824. In an embodiment, the predefined condition is the intermediate value $N_{info}$ is rounded up to 3825.

Figure 5:
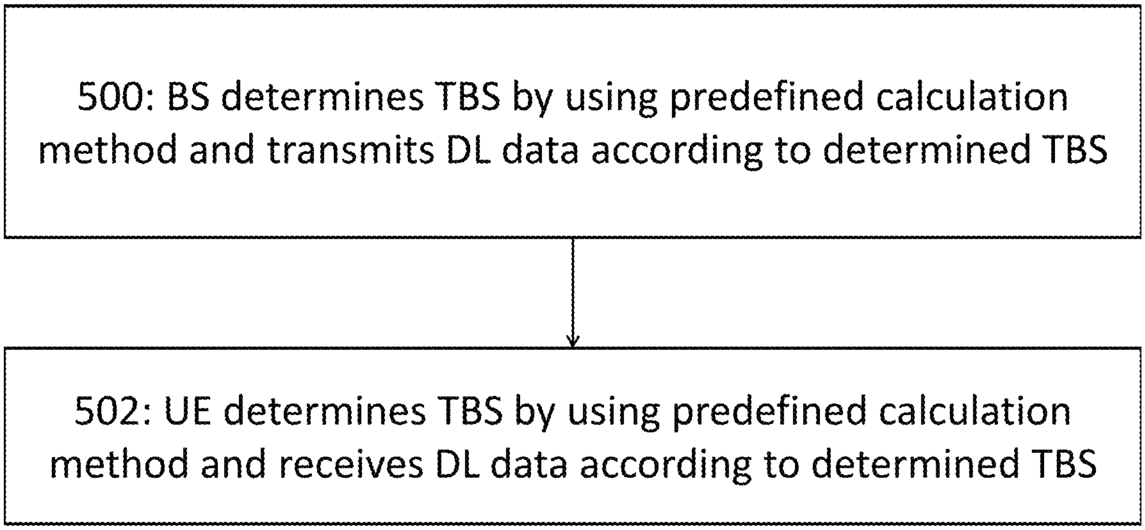
FIG. 5 shows a schematic diagram of a procedure of DL data transmissions between the UE and the BS according to an embodiment of the present disclosure.

FIG. 5 shows a schematic diagram of a procedure of DL data transmissions between the UE and the BS according to an embodiment of the present disclosure. In FIG. 5, the BS determines a TBS by using a predefined calculation method associated with the intermediate value $N_{info}$ when determining that the parameter or the signaling is not received from the UE. Next, the BS transmits DL data to the UE according to the determined TBS (step 500). Similarly, the UE determines a TBS by using the predefined calculation method associated with the intermediate value $N_{info}$ when determining not having the parameter or the signaling, or the parameter or the signaling is not transmitted to the BS. The UE receives the DL data according to the determined TBS (step 502). Because both the BS and the UE determine the TBS by using the same predefined calculation method associated with the intermediate value $N_{info}$, the BS and the UE determine the same TBS and the reliability of data transmissions between the BS and the UE is ensured.

Figure 6:
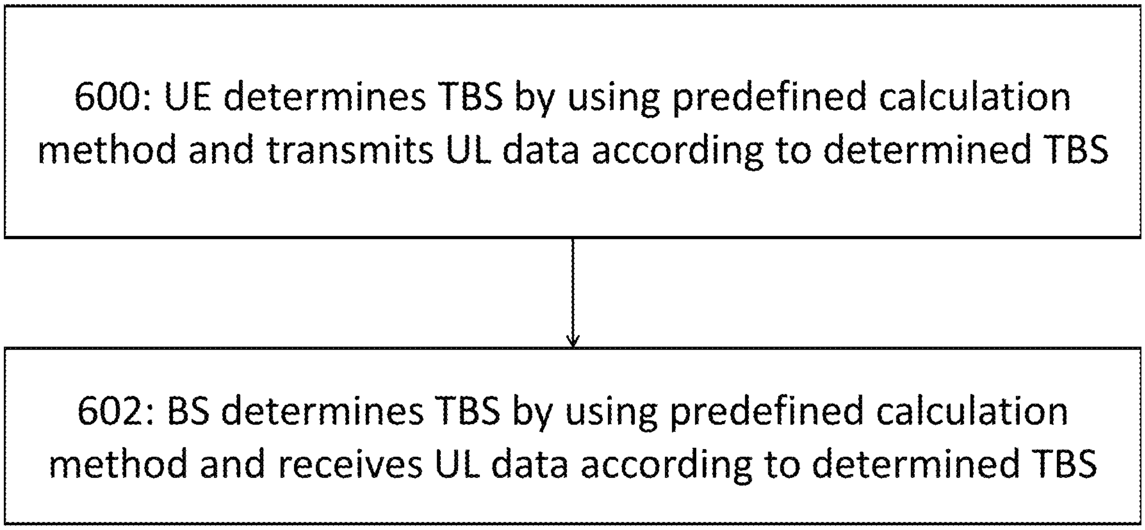
FIG. 6 shows a schematic diagram of a procedure of UL data transmissions between the UE and the BS according to an embodiment of the present disclosure.

FIG. 6 shows a schematic diagram of a procedure of UL data transmissions between the UE and the BS according to an embodiment of the present disclosure. In FIG. 6, the UE determines a TBS by using a predefined calculation method associated with the intermediate value $N_{info}$ when determining not having the parameter or the signaling, or the parameter or the signaling is not transmitted to the BS. Next, the UE transmits UL data to the BS according to the determined TBS (step 600). Similarly, the BS determines a TBS by using the predefined calculation method associated with the intermediate value $N_{info}$ when determining that the parameter or the signaling is not received from the UE. The BS receives the UL data according to the determined TBS (step 602). Because both the BS and the UE determine the TBS by using the same predefined calculation method associated with the intermediate value $N_{info}$, the BS and the UE determine the same TBS and the reliability of data transmissions between the BS and the UE is ensured.

In an embodiment, the method of calculating (e.g., modifying) the intermediate value $N_{info}$ during the procedure of determining the TBS is determined based on the parameter or the signaling. In an embodiment, the event which is associated with the intermediate value $N_{info}$ and indicated by the parameter or the signaling is whether the intermediate value $N_{info}$ is modified by a predefined function during the procedure of determining the TBS. In an embodiment, the predefined function is one of rounding down, rounding up, rounding or retaining at a float precision.

In an embodiment, the parameter or the signaling indicates whether the UE supports retaining the intermediate value $N_{info}$ at the float precision (i.e., modifying the intermediate value $N_{info}$ by retaining the intermediate value $N_{info}$ at the float precision) during the procedure of determining the TBS. When the parameter or the signaling indicates the UE supports retaining the intermediate value $N_{info}$ at the float precision, the UE and/or the BS calculates the intermediate value $N_{info}$ (e.g., by $N_{info}=N_{RE}\cdot R\cdot Q_m\cdot v$) at the float precision. When the parameter or the signaling indicate the UE does not support retaining the intermediate value $N_{info}$ at the float precision, the UE and/or BS calculates the intermediate value $N_{info}$ by using a predefined function. For example, the UE and/or BS may calculate the intermediate value $N_{info}$ by:

$$N_{info} = \text{function}(N_{RE}\cdot R\cdot Q_m\cdot v)$$

where function(x) represents transforming the value of x into an integer. In an embodiment, function(x) represents rounding the value of x down to an integer. In an embodiment, function(x) represents rounding the value of x up to an integer. In an embodiment, function(x) represents rounding the value of x to an integer.

FIG. 7 shows a table related to the parameter or the signaling according to an embodiment of the present disclosure. In FIG. 7, the parameter or the signaling indicates whether the UE supports retaining the intermediate value $N_{info}$ at the float precision, e.g., during the procedure of determining the TBS. In FIG. 7, "Per" indicates the level the associated parameter is included, "UE" in the column of "Per" indicates the associated parameter is signaled per UE, "Yes" in the column of "M" indicates the associated feature is mandatory. In addition, "No" in the columns of "FDD-TDD DIFF" and "FR1-FR2 DIFF" indicates the features associated to "FDD-TDD DIFF" and "FR1-FR2 DIFF" are optional, wherein the feature associated to "FDD-TDD DIFF" is that the parameter or the signaling has different values for frequency division duplexing (FDD) and time division duplexing (TDD) and the feature associated to "FR1-FR2 DIFF" is that the parameter or the signaling has different values for frequency ranges FR1 and FR2. Based on table shown in FIG. 7, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is a media access control (MAC) parameter. In an embodiment, the parameter or the signaling is a physical layer parameter.

In an embodiment of the UE determines not having the parameter or the signaling (e.g. the parameter or the signaling does not exist) indicating whether the UE supports retaining the intermediate value $N_{info}$ at the float precision or the parameter or the signaling indicating whether the UE supports retaining the intermediate value $N_{info}$ at the float precision is not transmitted to the BS, the UE and/or BS calculates the intermediate value $N_{info}$ (e.g. by $N_{info}=N_{RE}\cdot R\cdot Q_m\cdot v$) at the float precision.

In an embodiment of the UE does not have the parameter or the signaling indicating whether the UE supports retaining the intermediate value $N_{info}$ at the float precision or the parameter or the signaling indicating whether the UE supports retaining the intermediate value $N_{info}$ at the float precision is not transmitted to the BS, the UE and/or BS calculates the intermediate value $N_{info}$ by using a predefined function during the procedure of determining the TBS. For example, the UE and/or BS may calculate the intermediate value $N_{info}$ by:

$$N_{info} = \text{function}(N_{RE} \cdot R \cdot Q_m \cdot v)$$

where function(x) represents transforming the value of x into an integer. In an embodiment, function(x) represents rounding the value of x down to an integer. In an embodiment, function(x) represents rounding the value of x up to an integer. In an embodiment, function(x) represents rounding the value of x to an integer.

In an embodiment, the parameter or the signaling indicates whether the UE supports calculating the intermediate value $N_{info}$ by using a predefined function, wherein the predefined function may be rounding down, rounding up or rounding. For example, the parameter or the signaling indicates whether the UE supports calculating the intermediate value $N_{info}$ by:

$$N_{info} = \text{function}(N_{RE} \cdot R \cdot Q_m \cdot v)$$

where function(x) represents transforming the value of x into an integer. In an embodiment, function(x) represents rounding the value of x down to an integer. In an embodiment, function(x) represents rounding the value of x up to an integer. In an embodiment, function(x) represents rounding the value of x to an integer.

In an embodiment of the parameter or the signaling indicating the UE supports calculating the intermediate value $N_{info}$ by using the predefined function, the UE and/or BS calculates the intermediate value $N_{info}$ by using the predefined function.

In an embodiment of the parameter or the signaling indicating the UE does not support calculating the intermediate value $N_{info}$ by using the predefined function, the UE and/or BS calculates the intermediate value $N_{info}$ by retaining the intermediate value $N_{info}$ at the float precision.

FIG. 8 shows a table related to the parameter or the signaling according to an embodiment of the present disclosure. Note that, the meanings of each column in the table shown in FIG. 8 are similar to those in the table shown in FIG. 7 and are not described herein for brevity. In FIG. 8, the parameter or the signaling indicates whether the UE supports calculating the intermediate value $N_{info}$ by using a floor function (i.e., rounding down). In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter.

FIG. 9 shows a table related to the parameter or the signaling according to an embodiment of the present disclosure. Note that, the meanings of each column in the table shown in FIG. 9 are similar to those in the table shown in FIG. 7 and are not described herein for brevity. In FIG. 9, the parameter or the signaling indicates whether the UE supports calculating the intermediate value $N_{info}$ by: function ($N_{info}$), wherein function(x) is one of rounding the value of x down to an integer, rounding the value of x up to an integer, rounding the value of x into an integer or retaining the value of x at the float decision. In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter. In an embodiment, the parameter or the signaling has 2 bits and 4 possible values of the parameter or the signaling with 2 bits are corresponding (e.g. mapped) to the 4 candidates of function(x) (i.e. rounding down, rounding up, rounding and retaining at the float precesion).

In an embodiment of the UE does not have the parameter or the signaling indicating whether the UE supports calculating the intermediate value $N_{info}$ by using the predefined function or the parameter or the signaling indicating whether the UE supports calculating the intermediate value $N_{info}$ by using the predefined function is not transmitted to the BS, the UE and/or BS calculates the intermediate value $N_{info}$ by using the predefined function. For example, the UE and/or BS may calculate the intermediate value $N_{info}$ by:

$$N_{info} = \text{function}(N_{RE} \cdot R \cdot Q_m \cdot v)$$

where function(x) represents transforming the value of x into an integer. In an embodiment, function(x) represents rounding the value of x down to an integer. In an embodiment, function(x) represents rounding the value of x up to an integer. In an embodiment, function(x) represents rounding the value of x to an integer. In an embodiment, function(x) denotes retaining the value of x at the float precision.

In an embodiment, the parameter or the signaling indicates valid or available resource parameters (e.g., with specific values) of determining the intermediate value $N_{info}$. In an embodiment, the TBS(s) corresponding to the resource parameters indicated by the parameter or the signaling may not be used for data transmission when the resource parameters are determined invalid based on the parameter or the signaling.

In an embodiment, the parameter or the signaling is signaled per UE. In an embodiment, if the UE supports both the frequency ranges FR1 and FR2, the parameter or the signaling has the same value for the frequency ranges FR1 and FR2. In an embodiment, if the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter.

In an embodiment, the parameter or the signaling indicates whether the resource parameters satisfying a predefined condition are valid or available for determining the intermediate value $N_{info}$. In an embodiment, the predefined condition may be whether function($N_{RE}\cdot R\cdot Q_m\cdot v$) is equal to a number within a range, wherein function(x) represents transforming (e.g. modifying) the value of x into an integer. In an embodiment, function(x) represents rounding the value of x down to an integer. In an embodiment, function(x) represents rounding the value of x up to an integer. In an embodiment, function(x) represents rounding the value of x to an integer. In an embodiment, function(x) denotes retaining the value of x at the float precision. In an embodiment, the range is a fixed integer. In an embodiment, the range is between two adjacent integers (e.g., 3824 and 3825).

In an embodiment, when determining not having the parameter or the signaling indicating whether the resource parameters satisfying the predefined condition is valid or determining the parameter or the signaling is not transmitted to the BS, the UE and/or BS may assume that the resource parameters satisfying the predefined condition are valid (e.g., the TBS(s) corresponding to the resource parameters satisfying the predefined condition is valid).

In an embodiment, when determining not having the parameter or the signaling indicating whether the resource parameters satisfying the predefined condition is valid or determining the parameter or the signaling is not transmitted to the BS, the UE and/or BS may assume that the resource parameters satisfying the predefined condition are invalid (e.g., the TBS(s) corresponding to the resource parameters satisfying the predefined condition is invalid).

In an embodiment, the parameter or the signaling indicates whether the resource parameters satisfying floor($N_{RE}\cdot R\cdot Q_m\cdot v$)=3824 are valid, wherein floor(x) denotes rounding the value of x down to an integer. When the parameter or the signaling indicates the resource parameters satisfying floor($N_{RE}\cdot R\cdot Q_m\cdot v$)=3824 are valid, the UE and/or BS may use the TBS(s) determined based on the resource parameters satisfying floor($N_{RE}\cdot R\cdot Q_m\cdot v$)=3824 for data transmissions. When the parameter or the signaling indicates the resource parameters satisfying floor($N_{RE}\cdot R\cdot Q_m\cdot v$)=3824 are invalid, the UE and/or BS does not use the TBS(s) determined based on the resource parameters satisfying floor($N_{RE}\cdot R\cdot Q_m\cdot v$)=3824 for data transmissions.

In an embodiment of determining not having the parameter or the signaling indicating whether the resource parameters satisfying floor($N_{RE}\cdot R\cdot Q_m\cdot v$)=3824 are valid, the UE and/or the BS assumes the resource parameters satisfying floor($N_{RE}\cdot R\cdot Q_m\cdot v$)=3824 are valid. For example, the UE may assume the TBS(s) corresponding to the resource parameters satisfying floor($N_{RE}\cdot R\cdot Q_m\cdot v$)=3824 is valid when determining not having the parameter or the signaling indicating whether the resource parameters satisfying floor ($N_{RE}\cdot R\cdot Q_m\cdot v$)=3824.

In an embodiment of determining not having the parameter or the signaling indicating whether the resource parameters satisfying floor($N_{RE}\cdot R\cdot Q_m\cdot v$)=3824 are valid, the UE and/or the BS assumes the resource parameters satisfying floor($N_{RE}\cdot R\cdot Q_m\cdot v$)=3824 are invalid. For example, the UE may assume the TBS(s) corresponding to the resource parameters satisfying floor($N_{RE}\cdot R\cdot Q_m\cdot v$)=3824 is invalid when determining not having the parameter or the signaling indicating whether the resource parameters satisfying floor ($N_{RE}\cdot R\cdot Q_m\cdot v$)=3824.

FIG. 10 shows a table related to the parameter or the signaling according to an embodiment of the present disclosure. Note that, the meanings of each column in the table shown in FIG. 10 are similar to those in the table shown in FIG. 7 and are not narrated herein for brevity. In FIG. 10, the parameter or the signaling indicates whether the resource parameters satisfying floor($N_{RE}\cdot R\cdot Q_m\cdot v$)=3824 are valid. In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is a RRC parameter. In an embodiment, the parameter or the signaling is a MAC parameter. In an embodiment, the parameter or the signaling is a physical layer parameter.

In an embodiment, the parameter or the signaling indicates whether the resource parameters satisfying $3824<\text{float}(N_{RE}\cdot R\cdot Q_m\cdot v)<3825$ are valid, wherein float(x) denotes retaining the value of x as the float precision. When the parameter or the signaling indicates the resource parameters satisfying $3824<\text{float}(N_{RE}\cdot R\cdot Q_m\cdot v)<3825$ are valid, the UE and/or BS may use the TBS(s) determined based on the resource parameters satisfying $3824<\text{float}(N_{RE}\cdot R\cdot Q_m\cdot v)<3825$ for data transmissions. When the parameter or the signaling indicates the resource parameters satisfying $3824<\text{float}(N_{RE}\cdot R\cdot Q_m\cdot v)<3825$ are invalid, the UE and/or BS does not use the TBS(s) determined based on the resource parameters satisfying $3824<\text{float}(N_{RE}\cdot R\cdot Q_m\cdot v)<3825$ for data transmissions.

In an embodiment of determining not having the parameter or the signaling indicating whether the resource parameters satisfying $3824<\text{float}(N_{RE}\cdot R\cdot Q_m\cdot v)<3825$ are valid, the UE and/or the BS assumes the resource parameters satisfying $3824<\text{float}(N_{RE}\cdot R\cdot Q_m\cdot v)<3825$ are invalid. For example, the UE may assume the TBS(s) corresponding to the resource parameters satisfying $3824<\text{float}(N_{RE}\cdot R\cdot Q_m\cdot v)<3825$ is invalid when determining not having the parameter or the signaling indicating whether the resource parameters satisfying $3824<\text{float}(N_{RE}\cdot R\cdot Q_m\cdot v)<3825$.

FIG. 11 shows a table related to the parameter or the signaling according to an embodiment of the present disclosure. Note that, the meanings of each column in the table shown in FIG. 11 are similar to those in the table shown in FIG. 7 and are not narrated herein for brevity. In FIG. 11, the parameter or the signaling indicates whether the resource parameters satisfying $3824<\text{float}(N_{RE}\cdot R\cdot Q_m\cdot v)<3825$ are valid. In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter.

In an embodiment, the parameter or the signaling indicates whether the resource parameters satisfying $3824 \le \text{float}(N_{RE} \cdot R \cdot Q_m \cdot v) < 3825$ are valid, wherein float(x) denotes retaining the value of x as the float precision. When the parameter or the signaling indicates the resource parameters satisfying $3824 \le \text{float}(N_{RE} \cdot R \cdot Q_m \cdot v) < 3825$ are valid, the UE and/or BS may use the TBS(s) determined based on the resource parameters satisfying $3824 \le \text{float}(N_{RE} \cdot R \cdot Q_m \cdot v) < 3825$ for data transmissions. When the parameter or the signaling indicates the resource parameters satisfying $3824 \le \text{float}(N_{RE} \cdot R \cdot Q_m \cdot v) < 3825$ are invalid, the UE and/or BS does not use the TBS(s) determined based on the resource parameters satisfying $3824 \le \text{float}(N_{RE} \cdot R \cdot Q_m \cdot v) < 3825$ for data transmissions.

In an embodiment of determining not having the parameter or the signaling indicating whether the resource parameters satisfying $3824 \le \text{float}(N_{RE} \cdot R \cdot Q_m \cdot v) < 3825$ are valid, the UE and/or the BS assumes the resource parameters satisfying $3824 \le \text{float}(N_{RE} \cdot R \cdot Q_m \cdot v) < 3825$ are invalid. For example, the UE may assume the TBS(s) corresponding to the resource parameters satisfying $3824 \le \text{float}(N_{RE} \cdot R \cdot Q_m \cdot v) < 3825$ is invalid when determining not having the parameter or the signaling indicating whether the resource parameters satisfying $3824 \le \text{float}(N_{RE} \cdot R \cdot Q_m \cdot v) < 3825$.

FIG. 11 shows a table related to the parameter or the signaling according to an embodiment of the present disclosure. Note that, the meanings of each column in the table shown in FIG. 11 are similar to those in the table shown in FIG. 7 and are not narrated herein for brevity. In FIG. 11, the parameter or the signaling indicates whether the resource parameters satisfying $3824 \le \text{float}(N_{RE} \cdot R \cdot Q_m \cdot v) < 3825$ are valid. In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter.

In an embodiment, the parameter or the signaling indicates valid or available TBS(s), e.g., for UE and/or BS. In an embodiment, the parameter or the signaling indicates the valid or available TBS(s) by indicating valid or available intermediate value(s) $N_{info}$. In an embodiment, this parameter or the signaling is signaled per UE. If the UE supports both the frequency ranges FR1 and FR2, this parameter or the signaling has the same value for the frequency ranges FR1 and FR2. If the UE supports both FDD and TDD, this parameter or the signaling has the same value for FDD and TDD. In an embodiment, the parameter or the signaling is a RRC parameter. In an embodiment, this parameter or the signaling is a MAC parameter. In an embodiment, this parameter or the signaling is a physical layer parameter.

In an embodiment, the parameter or the signaling indicates whether TBS(s) in a TBS set is supported (e.g., valid). In an embodiment, the parameter or the signaling indicates whether TBS(s) corresponding to each intermediate value $N_{info}$ in an intermediate value set is supported (e.g., valid). When the parameter or the signaling indicates TBS(s) in the TBS set or corresponding to the each intermediate value $N_{info}$ in the intermediate value set is supported, the UE may use the indicated TBS for performing data transmissions. When the parameter or the signaling indicates TBS(s) in the TBS set or corresponding to each intermediate value $N_{info}$ in the intermediate value set is not supported, the UE may not use the indicated TBS for performing data transmissions. In an embodiment, all of TBSs in the TBS set or corresponding to each intermediate value $N_{info}$ in the intermediate value set are integers, which can be evenly divisible by 8. In an embodiment, TBS(s) in the TBS set or corresponding to each intermediate value $N_{info}$ in the intermediate value set comprises at least one of 3824, 3840 and/or 3848.

In an embodiment of the parameter or the signaling indicating valid or available TBS(s), the UE and/or BS may assume the indicated TBS(s) is valid for data transmissions when determining that the UE does not have the parameter or the signaling and/or that the UE does not transmit the parameter or the signaling to the BS.

In an embodiment of the parameter or the signaling indicating valid or available TBS(s), the UE and/or BS may assume the indicated TBS(s) is invalid for data transmissions when determining that the UE does not have the parameter or the signaling and/or that the UE does not transmit the parameter or the signaling to the BS.

In an embodiment, the parameter or the signaling indicates whether TBS=3824 (i.e., TBS set or the TBS corresponding to each intermediate value $N_{info}$ in an intermediate value set comprises 3824) is supported. When the parameter or the signaling indicates TBS=3824 is supported, the UE and/or BS may perform data transmissions by using the TBS with the value of 3824. When the parameter or the signaling indicates TBS=3824 is not supported, the UE and/or BS does not use the TBS with the value of 3824 to perform data transmissions. In this embodiment, the function of modifying the intermediate value $N_{info}$ may be rounding down (i.e., $N_{info} = \text{floor}(N_{RE} \cdot R \cdot Q_m \cdot v)$). In this embodiment, the function of modifying the intermediate value $N_{info}$ may be rounding up (i.e., $N_{info} = \text{ceil}(N_{RE} \cdot R \cdot Q_m \cdot v)$, wherein ceil(x) denotes rounding the value of x up to an integer). In this embodiment, the function of modifying the intermediate value $N_{info}$ may be rounding. In this embodiment, the function of modifying the intermediate value $N_{info}$ may be retaining at the float precision (i.e., $N_{info} = \text{float}(N_{RE} \cdot R \cdot Q_m \cdot v)$, wherein float (x) denotes retaining the value of x at the float precision).

In an embodiment of the parameter or the signaling indicating whether TBS=3824 is supported, the UE and/or BS may assume the TBS with the value of 3824 is valid for data transmissions when determining that the UE does not have the parameter or the signaling and/or that the parameter or the signaling is not transmitted to the BS.

In an embodiment of the parameter or the signaling indicating whether TBS=3824 is supported, the UE and/or BS may assume the TBS with the value of 3824 is invalid for data transmissions when determining that the UE does not have the parameter or the signaling and/or that the parameter or the signaling is not transmitted to the BS.

FIG. 13 shows a table related to the parameter or the signaling according to an embodiment of the present disclosure. Note that, the meanings of each column in the table shown in FIG. 13 are similar to those in the table shown in FIG. 7 and are not narrated herein for brevity. In FIG. 13, the parameter or the signaling indicates whether TBS=3824 is supported. In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter.

In an embodiment, the parameter or the signaling indicates whether TBSs=3840 and 3848 (i.e., TBS set or the TBSs corresponding to each intermediate value $N_{info}$ in an intermediate value set comprise 3840 and 3848) are supported. When the parameter or the signaling indicates TBSs=3840 and 3848 are supported, the UE and/or BS may perform data transmissions by using the TBS with the value of 3840 or 3848. When the parameter or the signaling indicates TBSs=3840 and 3848 are not supported, the UE and/or BS does not use the TBS with the value of 3840 or 3848 to perform data transmissions. In this embodiment, the function of modifying the intermediate value $N_{info}$ may be rounding down (i.e., $N_{info}$=floor($N_{RE}$·R·$Q_m$·v)). In this embodiment, the function of modifying the intermediate value $N_{info}$ may be rounding up (i.e., $N_{info}$=ceil ($N_{RE}$·R·$Q_m$·v), wherein ceil(x) denotes rounding the value of x up to an integer). In this embodiment, the function of modifying the intermediate value $N_{info}$ may be rounding. In this embodiment, the function of modifying the intermediate value $N_{info}$ may be retaining at the float precision (i.e., $N_{info}$=float ($N_{RE}$·R·$Q_m$·v), wherein float(x) denotes retaining the value of x at the float precision).

In an embodiment of the parameter or the signaling indicating whether TBSs=3840 and 3848 is supported, the UE and/or BS may assume the TBS with the value of 3840 or 3848 is valid for data transmissions when determining that the UE does not have the parameter or the signaling and/or that the parameter or the signaling is not transmitted to the BS.

In an embodiment of the parameter or the signaling indicating whether TBSs=3840 and 3848 is supported, the UE and/or BS may assume the TBS with the value of 3840 or 3848 is invalid for data transmissions when determining that the UE does not have the parameter or the signaling and/or that the parameter or the signaling is not transmitted to the BS.

FIG. 14 shows a table related to the parameter or the signaling according to an embodiment of the present disclosure. Note that, the meanings of each column in the table shown in FIG. 14 are similar to those in the table shown in FIG. 7 and are not narrated herein for brevity. In FIG. 14, the parameter or the signaling indicates whether TBS=3840 and 3848 is supported. In addition, the parameter or the signaling is signaled per UE. If the UE supports both the frequency ranges FR1 and FR2, the parameter or the signaling has the same value for the frequency ranges FR1 and FR2. If the UE supports both FDD and TDD, the parameter or the signaling has the same value for FDD and TDD. In an embodiment, the parameter or the signaling is an RRC parameter. In an embodiment, the parameter or the signaling is a MAC parameter. In an embodiment, the parameter or the signaling is a physical layer parameter.

In an embodiment, a base graph of data processing (e.g., base graph of LDPC coding) is determined based on the TBS and a threshold which related to the TBS and used for determining the base graph is adjusted by a modified factor β at at least one event. In an embodiment, the modified factor is smaller than or equal to 24 and is greater than or equal to −24. In an embodiment, the at least one event comprises at least one of:

(a) The intermediate value $N_{info}$ is a number between two adjacent integers (e.g., 3824 and 3825;

(b) The intermediate value $N_{info}$ is a number that is equal to one of the two adjacent integers (e.g., 3824 and 3825); or (c) The TBS is among the TBSs in a quantized set, wherein the TBSs in the quantized set are between 3824 and 3848, and are evenly divisible by 8.

More specifically, in an embodiment, the base graph BG2 for UL/DL data transmissions is determined based on a predefined condition PC1. In an embodiment, the base graph BG1 for UL/DL data transmissions is determined based on a predefined condition PC2. In an embodiment, the predefined condition PC1 is configured by the L1 signaling or high-layer signaling. In an embodiment, the predefined condition PC1 is a float value R related to the rate is larger than a threshold r0 and not larger than a threshold r1, wherein the thresholds r0 and r1 are float numbers and may be equal to zero. In an embodiment, the predefined condition PC1 is the TBS is larger than a threshold t0 and not larger than a threshold t1, wherein the thresholds t0 and t1 are integer numbers and not smaller than 0. In an embodiment, the predefined condition PC2 is configured by L1 signaling or high-layer signaling. In an embodiment, the predefined condition PC2 is the value R related to the rate is larger than a threshold r2 and not larger than a threshold r3, wherein the thresholds r2 and r3 are float numbers and may be equal to zero. In an embodiment, the predefined condition PC2 is the TBS is larger than a threshold t2 and not larger than a threshold t3, wherein the thresholds t2 and t3 are integer numbers and not smaller than 0. In an embodiment, the threshold t1 is equal to the threshold t2 based on a specific condition of the value R. In an embodiment, the threshold r1 is equal to the threshold r2 based on a specific condition of TBS. In an embodiment, the threshold t0 is equal to the threshold t2 and the threshold t1 is equal to the threshold t3 based on a specific condition of the value R. In an embodiment, the threshold r0 is equal to the threshold r2 and the threshold r1 is equal to the threshold r3 based on a specific condition of TBS.

In an embodiment, if the TBS is larger than the threshold t and not larger than the threshold t1 when the value R satisfies a specific condition SC1, the base graph BG2 for UL/DL data transmissions is determined selected. In this embodiment, the threshold t1 is adjusted to 3824+β. In an embodiment, if TBS is larger than the threshold t2 and not larger than the threshold t3 when the value R satisfies the same specific condition SC1, the base graph BG1 for UL/DL data transmissions is determined, wherein the threshold t2 is adjusted to be equal to the threshold t1. In an embodiment, the modified factor β is a positive integer and not smaller than 16. In an embodiment, the modified factor β is a negative integer and not greater than −8. In an embodiment, the specific condition SC1 is that the value R is not larger than ⅔. In an embodiment, the specific condition SC1 is that the value R is larger than ¼.

In an embodiment, the UE assumes that the TBS determined as a specific value may be the TBS with another value when the data is not successfully decoded by using the TBS with the specific value. In an embodiment, the specific value is 3824, 3840 or 3848, and the TBS with another value is one of 3824, 3840 and 3848 except for the specific value.

In an embodiment, the modified factor β is 24. In this embodiment, when the value R≤¼, the base graph BG2 for data processing is determined (e.g., selected). When ¼<R≤⅔ and the TBS is larger than the threshold t0=0 and not larger than the threshold t1=3848, the base graph BG2 is selected. In an implementation, when ¼<R≤⅔ and the TBS is larger than the threshold t2=3848, the base graph BG1 for data processing is selected. In an embodiment, when R>⅔ and the TBS is not larger than 292, the base graph BG2 is selected. In an embodiment, when R>⅔ and the TBS is larger than 292, the base graph BG1 is selected. For example, the BG selection mechanism may be expressed as the table shown in FIG. 15.

In an embodiment, if when the UE modifies the intermediate value $N_{info}$ by retaining the intermediate value $N_{info}$ at the float precision during the procedure of determining the TBS and is scheduled with TBS=3840 and ¼<R≤⅔, the UE may assume that TBS=3824 after the transport block (TB) cyclic redundancy check (CRC) is not decoded successfully. For example, when the UE modifies the intermediate value $N_{info}$ by retaining the intermediate value $N_{info}$ at the float precision during the procedure of determining the TBS and determines that TBS=3840, the UE selects the base graph BG2 to encode or decode the scheduling data. If the UE dose not decode the TB CRC successfully, the UE may assume that TBS=3824 and decodes the schedule data and TB CRC bits by using the TBS=3824.

Based on the table shown in FIG. 15, the UE modifying the intermediate value $N_{info}$ by retaining the intermediate value $N_{info}$ at the float precision and the UE modifying the intermediate value $N_{info}$ by rounding the intermediate value $N_{info}$ down to an integer are prevented from selecting different base graphs of LDPC. For example, the resource parameters with certain values may make the UE modifying the intermediate value $N_{info}$ by retaining the intermediate value $N_{info}$ at the float precision select the base graph BG1 and makes the UE modifying the intermediate value $N_{info}$ by rounding the intermediate value $N_{info}$ down to an integer select the base graph BG2. By adopting the aforementioned method for selecting the base graph, the UE modifying the intermediate value $N_{info}$ by retaining the intermediate value $N_{info}$ at the float precision would select the base graph BG2 rather than BG1 based on the same resource parameters.

In an embodiment, the modified factor β is −8. In this embodiment, when the value R≤¼, the base graph BG2 for data processing is determined (e.g., selected). When ¼<R≤⅔ and the TBS is smaller than the threshold 3824 (i.e., 3816<t1<3824), the base graph BG2 is selected. In an implementation, when ¼<R≤⅔ and the TBS is not smaller than 3824, the base graph BG1 for data processing is selected. In an embodiment, when R>⅔ and the TBS is not larger than 292, the base graph BG2 is selected. In an embodiment, when R>⅔ and the TBS is larger than 292, the base graph BG1 is selected. For example, the BG selection mechanism may be expressed as the table shown in FIG. 16.

Based on the table shown in FIG. 16, the UE modifying the intermediate value $N_{info}$ by retaining the intermediate value $N_{info}$ at the float precision and the UE modifying the intermediate value $N_{info}$ by rounding the intermediate value $N_{info}$ down to an integer are prevented from selecting different base graphs of LDPC. For example, the resource parameters with certain values may make the UE modifying the intermediate value $N_{info}$ by retaining the intermediate value $N_{info}$ at the float precision select the base graph BG1 and makes the UE modifying the intermediate value $N_{info}$ by rounding the intermediate value $N_{info}$ down to an integer select the base graph BG2. By adopting the table shown in FIG. 16, the UE modifying the intermediate value $N_{info}$ by rounding the intermediate value $N_{info}$ down to an integer would select the base graph BG1 rather than BG2 based on the same resource parameters.

In an embodiment, the modified factor β is the maximum value of TBS available for UL/DL data transmission. In this embodiment, when the value R≤¼, the base graph BG2 for data processing is determined (e.g., selected). When ¼<R≤⅔ and the TBS is larger than the threshold t0=0, the base graph BG2 is selected. For example, the BG selection mechanism may be expressed as the table shown in FIG. 17.

In an embodiment, when the value R≤¼, the base graph BG2 for data processing is determined (e.g., selected). When ¼<R and the TBS is larger than the threshold t0=292, the base graph BG1 is selected. For example, the BG selection mechanism may be expressed as the table shown in FIG. 18.

In an embodiment, the UE calculating the intermediate value $N_{info}$ in the integer precision may utilize a new base graph based on a predefined condition. In an embodiment, the predefined condition is that intermediate value $N_{info}$ is not smaller than 3824 and smaller than 3825. In an embodiment, the predefined condition is that the TBS is equal to 3824 and the scheduled data is not received successfully by the UE. In an embodiment, the predefined condition is that the TBS is equal to 3840 or 3848 and the scheduled data is not received successfully by the UE. In an embodiment, the predefined condition is that the TBS is equal to 3824 and the intermediate value $N_{info}$ calculated by $N_{info}$=floor($N_{RE}$·R·$Q_m$·v). In an embodiment, the predefined condition is that the TBS is equal to 3840 or 3848 and the intermediate value $N_{info}$ is calculated by: $N_{info}$=float($N_{RE}$·R·$Q_m$·v).

In an embodiment, for the second step of TBS determination procedure, if floor($N_{RE}$*R*$Q_m$*v*2N)<3824*$2^N$, the UE shall use step 3 as the next step of the TBS determination, otherwise, the UE shall use step 4 as the next step of the TBS determination. In an embodiment, N is an integer that is not smaller than 5.

In an embodiment, the UE and/or BS determines the intermediate value $N_{info}$ based on a plurality of resource parameters, for determining the TBS. In an embodiment, the plurality of parameters comprises the total number $N_{RE}$ of resource elements, the value R related to rate, the modulation order $Q_m$ and the number v of layers. In an embodiment, the intermediate value $N_{info}$ is a fixed function of the product of the plurality of parameters. In an embodiment, the fixed function is one of rounding down, or rounding up, or rounding.

For example, the UE determines the total number NRE of resource elements and then calculates the intermediate value $N_{info}$ by:

$$N_{info} = \text{function}(N_{RE} \cdot R \cdot Q_m \cdot v)$$

wherein function(x) represents transforming the value of x into an integer. In an embodiment, function(x) represents rounding the value of x down to an integer. In an embodiment, function(x) represents rounding the value of x up to an integer. In an embodiment, function(x) represents rounding the value of x to an integer.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc., can be configured to perform one or more of the functions described herein. The term "configured to" or "configured for" as used herein with respect to a specified operation or function refers to a processor, device, component, circuit, structure, machine, unit, etc., that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media comprises both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:

determining a transport block size (TBS) based on a higher layer parameter associated with an event of determining an intermediate value of a TBS determination procedure, wherein the intermediate value is determined based on a plurality of resource parameters, wherein the plurality of resource parameters comprises at least one of a total number of resource elements allocated to the wireless terminal, a rate, a modulation order, and a number of layers, wherein:

the wireless terminal supports a release version indicated by the higher layer parameter and the higher layer parameter is available for the wireless terminal, and wherein the event is whether the intermediate value is modified by a predefined function, the predefined function is rounding to an integer, or the wireless terminal does not support the release version determined by the higher layer parameter and the higher layer parameter is not available for the wireless terminal, and wherein the event is whether the intermediate value is modified by a predefined function, the predefined function is retaining at a float precision.

2. The wireless communication method of claim 1, wherein the plurality of resource parameters with specific values is valid in a predefined calculation method.

3. A wireless communication method for use in a wireless network node, the wireless communication method comprising:

determining a transport block size (TBS) based on a higher layer parameter associated with an event of determining an intermediate value of a TBS determination procedure, wherein the intermediate value is determined based on a plurality of resource parameters, wherein the plurality of resource parameters comprises at least one of a total number of resource elements allocated to the wireless network node, a rate, a modulation order, and a number of layers, wherein:

the wireless network node supports a release version indicated by the higher layer parameter and the higher layer parameter is available for the wireless network node, and wherein the event is whether the intermediate value is modified by a predefined function, the predefined function is rounding to an integer, or the wireless network node does not support the release version determined by the higher layer parameter and the higher layer parameter is not available for the wireless network node, and wherein the event is whether the intermediate value is modified by a predefined function, the predefined function is retaining at a float precision.

4. The wireless communication method of claim 3, wherein the plurality of resource parameters with specific values is valid in a predefined calculation method.

5. A wireless terminal, comprising at least one processor configured to:

determine a transport block size (TBS) based on a higher layer parameter associated with an event of determining an intermediate value of a TBS determination procedure, wherein the intermediate value is determined based on a plurality of resource parameters, wherein the plurality of resource parameters comprises at least one of a total number of resource elements allocated to the wireless terminal, a rate, a modulation order, and a number of layers, wherein:

the wireless terminal supports a release version indicated by the higher layer parameter and the higher layer parameter is available for the wireless terminal, and wherein the event is whether the intermediate value is modified by a predefined function, the predefined function is rounding to an integer, or the wireless terminal does not support the release version determined by the higher layer parameter and the higher layer parameter is not available for the wireless terminal, and wherein the event is whether the intermediate value is modified by a predefined function, the predefined function is retaining at a float precision.

6. The wireless terminal of claim 5, wherein the plurality of resource parameters with specific values is valid in a predefined calculation method.

7. A wireless network node, comprising at least one processor configured to:

determine a transport block size (TBS) based on a higher layer parameter associated with an event of determining an intermediate value of a TBS determination procedure, wherein the intermediate value is determined based on a plurality of resource parameters, wherein the plurality of resource parameters comprises at least one of a total number of resource elements allocated to the wireless network node, a rate, a modulation order, and a number of layers, wherein:

the wireless network node supports a release version indicated by the higher layer parameter and the higher layer parameter is available for the wireless network node, and wherein the event is whether the intermediate value is modified by a predefined function, the predefined function is rounding to an integer, or the wireless network node does not support the release version determined by the higher layer parameter and the higher layer parameter is not available for the wireless network node, and wherein the event is whether the intermediate value is modified by a predefined function, the predefined function is retaining at a float precision.

8. The wireless network node of claim 7, wherein the plurality of resource parameters with specific values is valid in a predefined calculation method.

* * * * *